United States Patent [19]
Bear

[11] Patent Number: 6,132,064
[45] Date of Patent: Oct. 17, 2000

[54] LASER POINTER

[75] Inventor: Hsiung Bear, Taipei, Taiwan

[73] Assignee: Limate Corporation, Taipei, Taiwan

[21] Appl. No.: 09/328,425

[22] Filed: Jun. 9, 1999

[51] Int. Cl.[7] .................................................. F21L 7/00
[52] U.S. Cl. .................... 362/259; 362/119; 362/110; 362/109; 362/200
[58] Field of Search .................................. 362/110, 259, 362/189, 200, 109, 119; 372/36

[56] References Cited

U.S. PATENT DOCUMENTS

| | | | |
|---|---|---|---|
| 5,268,829 | 12/1993 | Lo | 362/259 |
| 5,803,582 | 9/1998 | Hunag | 362/109 |
| 5,882,106 | 3/1999 | Galli | 362/259 |
| 6,027,224 | 2/2000 | Schnell | 362/119 |

Primary Examiner—Thomas M. Sember
Attorney, Agent, or Firm—Rosenberg, Klein & Lee

[57] ABSTRACT

A laser pointer, which includes a box-like bottom cover shell holding a laser module and a battery cell. A top cover shell is covered on the bottom cover shell. The top cover shell has a spring strip, a first metal contact plate connected between the negative terminal of the laser module and the battery cell, a second metal contact plate connected to the positive terminal of the laser module, and a third metal contact plate fastened to the spring strip of the top cover shell at a bottom side and connected to the positive terminal of the battery cell. Wherein when the spring strip is pressed downwards, the third metal contact plate is forced into contact with the second metal contact plate, thereby causing the laser module to be turned on to emit a laser beam out of a laser firing hole at the top cover shell.

7 Claims, 5 Drawing Sheets

LASER POINTER

BACKGROUND OF THE INVENTION

The present invention relates to a laser pointer, and more particularly to such a laser pointer, that can be fastened to a gun, and conveniently operated to emit a laser beam for guiding the eye.

A variety of laser pointers have been disclosed for use to pint things out on a map, black board, etc. There is also known a laser pointer designed for use with a gun to guide the eye. This structure of laser pointer is comprised of a casing, a laser module, a battery, and a switch. The casing is formed of two frame shells, that are fastened together by screws, and fixed to the hand stock of the pistol. The casing has a coupling flange fastened to the trigger guard. The laser module mounted in a box, which is fastened to one frame shell of the casing and coupled to the coupling flange of the casing at the trigger guard. The battery is mounted at the bottom side of the box. The switch is mounted on the box, and controlled to turn on/off the laser module. Further, a plurality of packing pads are provided for mounting in the frame shells of the casing selectively, enabling the laser pointer to fit any of a variety of pistols. This laser pointer is heavy and complicated, and its manufacturing cost is high. Further, during operation, the user must hold the pistol with one hand, and turn on the laser pointer with the other hand Further, it is complicated to calibrate the focal distance of the laser module.

SUMMARY OF THE INVENTION

The present invention has been accomplished to provide a laser pointer which eliminates the aforesaid drawbacks. It is one object of the present invention to provide a laser pointer, which is practical for use with a gun to guide the eye. It is another object of the present invention to provide a laser pointer for use with a gun, which can conveniently be operated with the thumb of the hand holding the gun. It is still another object of the present invention to provide a laser pointer, which can conveniently be fastened to the hand stock of a gun to guide the eye. It is still another object of the present invention to provide a laser pointer for use with a gun, which is compact. According to the preferred embodiment of the present invention, the laser pointer is comprised of a bottom cover shell shaped like a flat box; a top cover shell covered on the bottom cover shell, the top cover shell having a laser firing hole; battery means mounted inside the bottom cover shell, the battery means having a negative terminal at a bottom side thereof and a positive terminal at a top side thereof; a laser module mounted in the bottom cover shell and controlled to emit a laser beam out of the laser firing hole at the top cover shell, the laser module comprising a laser diode and lens unit, and a circuit board connected to the laser diode and lens unit and controlled to drive the laser diode and lens unit, the circuit board having a positive terminal and a negative terminal; a first metal contact plate fixedly mounted in the bottom cover shell, the first metal contact plate having a lead end connected to the negative terminal of the circuit board and a tail end disposed in contact with the negative terminal of the battery means; a second metal contact plate fixedly mounted in the bottom cover shell, the second metal contact plate having a lead end connected to the positive terminal of the battery means and a tail end; and a third metal contact plate fixedly fastened to the top cover shell, the third metal contact plate having a lead end suspended above the tail end of the second metal contact plate, and a tail end disposed in contact with the positive terminal of the battery means; wherein when the lead end of the third metal contact plate is forced downwards into contact with the tail end of the second metal contact plate, the circuit board is triggered to drive the laser diode and lens unit, causing the laser diode and lens unit to emit a laser beam out of the laser firing hole at the top cover shell.

DETAILED DESCRIPTION OF THE PREFERRED EMBODIMENT

Figure 1:
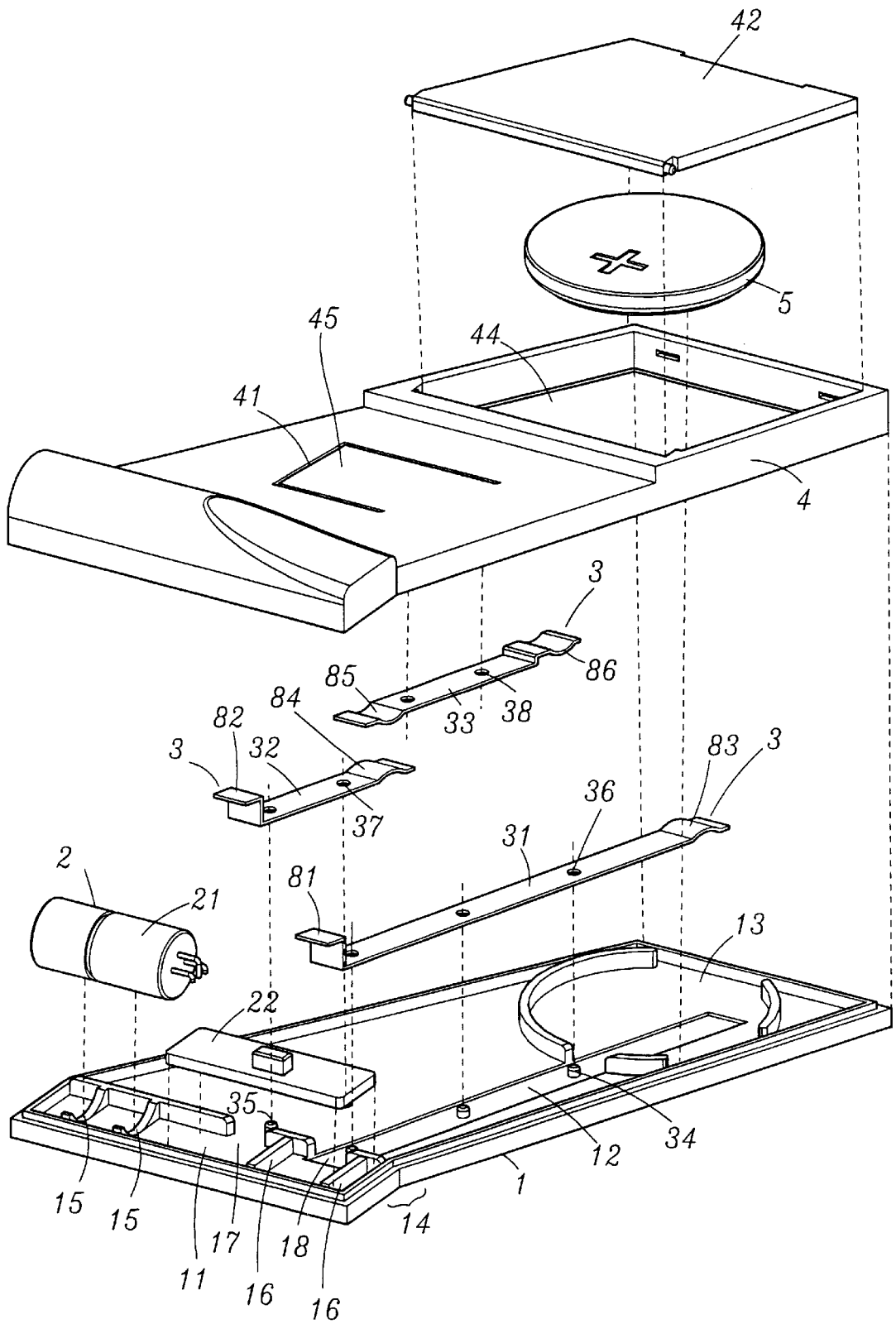
FIG. 1 is an exploded view of a laser pointer according to the present invention.
Figure 5:
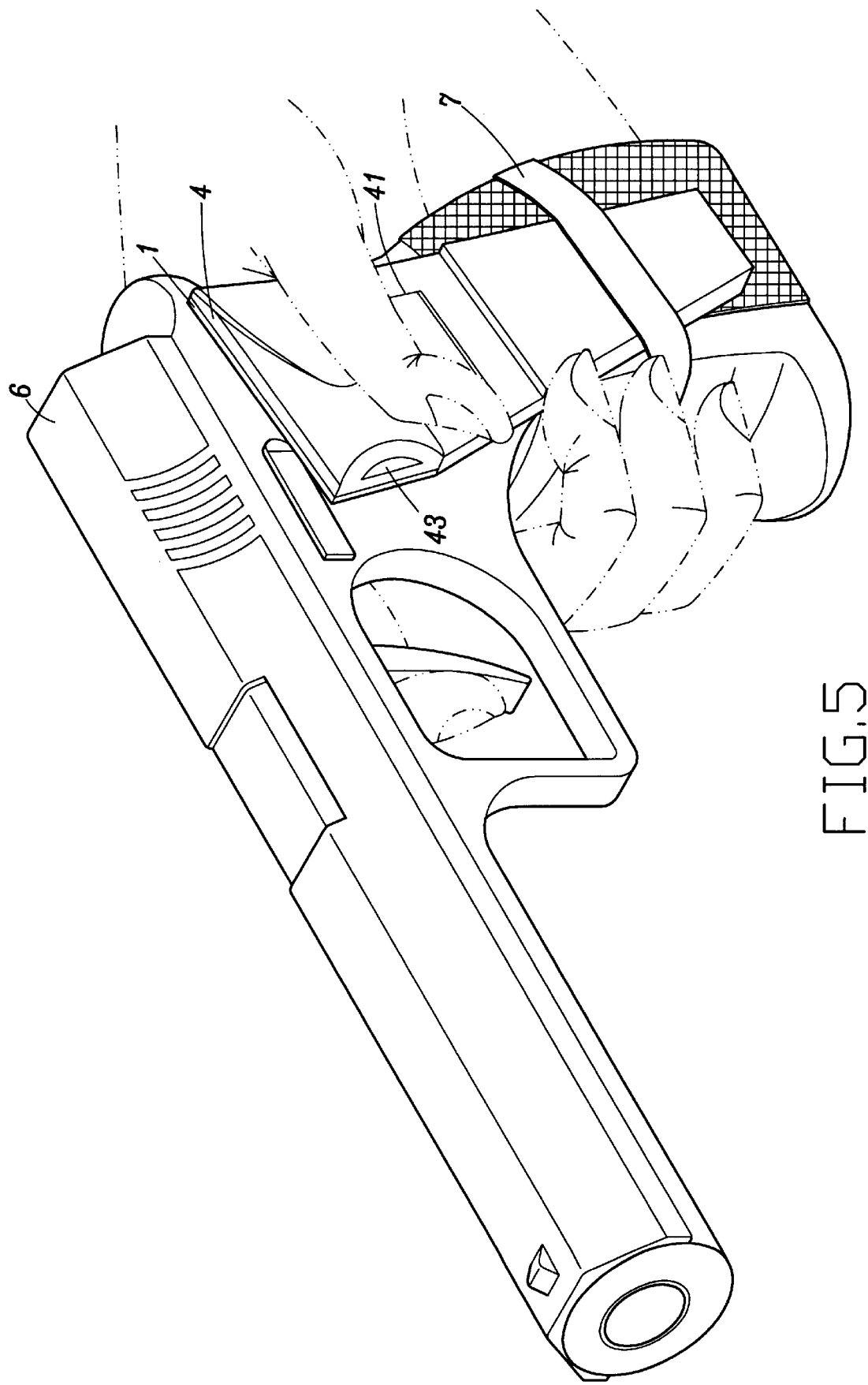
FIG. 5 is an applied view of the present invention, showing the laser pointer fastened to the hand stock of a pistol.

Referring to FIGS. 1 and 5, a laser pointer is shown installed in a pistol 6, and operated to emit a laser beam to guide the eye. The laser pointer comprises a bottom cover shell 1, a laser module 2, a plurality of metal contact plates 3, a top cover shell 4, and a battery cell 5.

Figure 2:
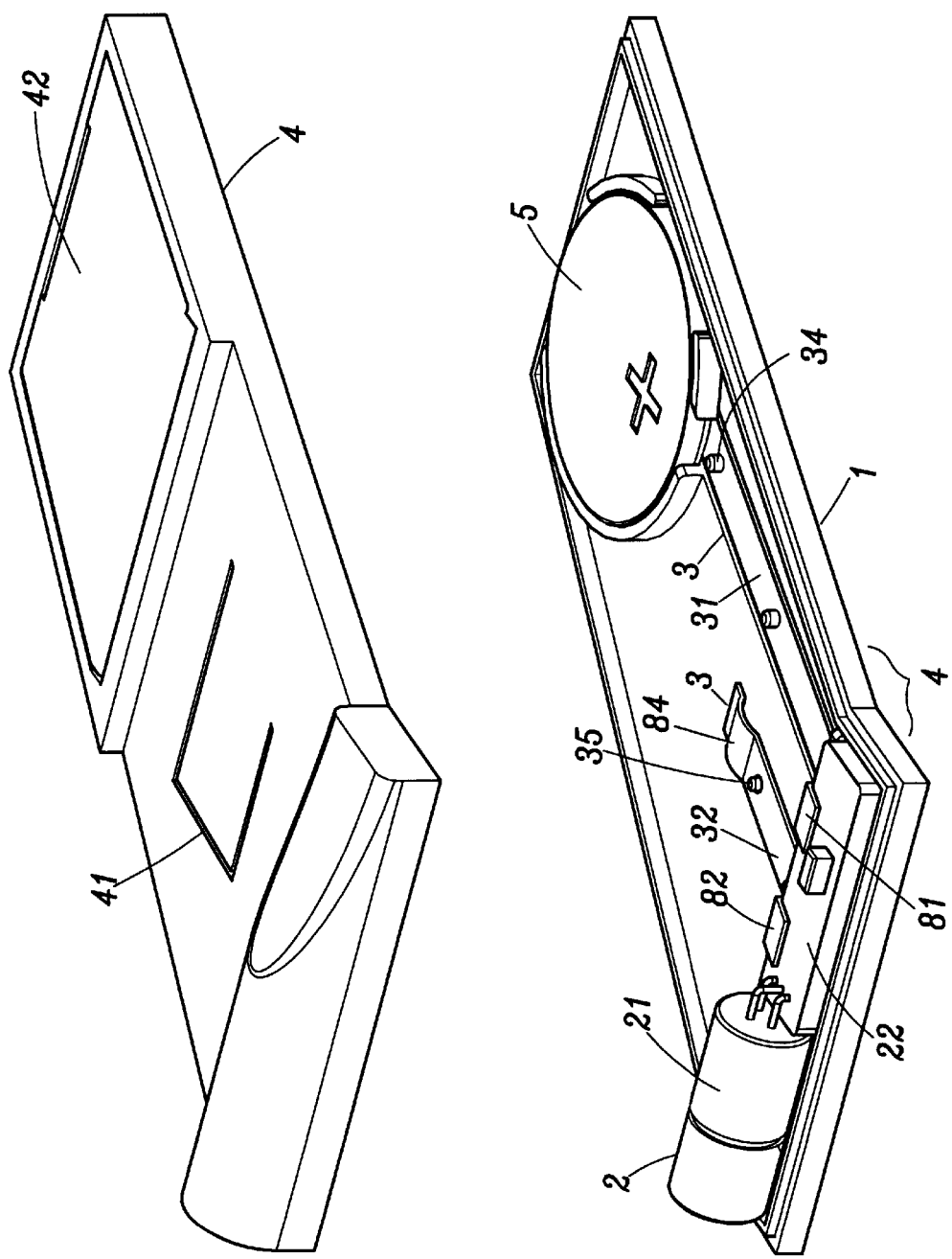
FIG. 2 is an assembly view of the present invention, showing the top cover shell opened.
Figure 3:
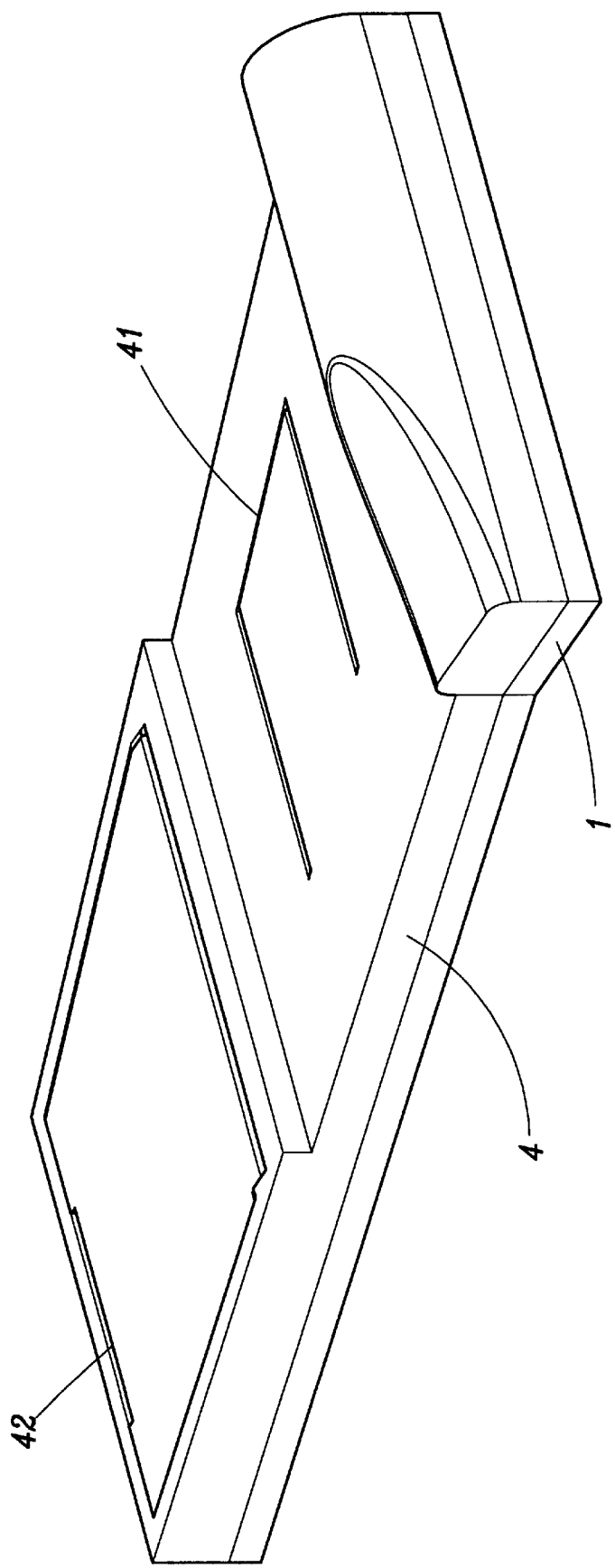
FIG. 3 illustrates the laser pointer designed for the left-handed persons according to the present invention.
Figure 4:
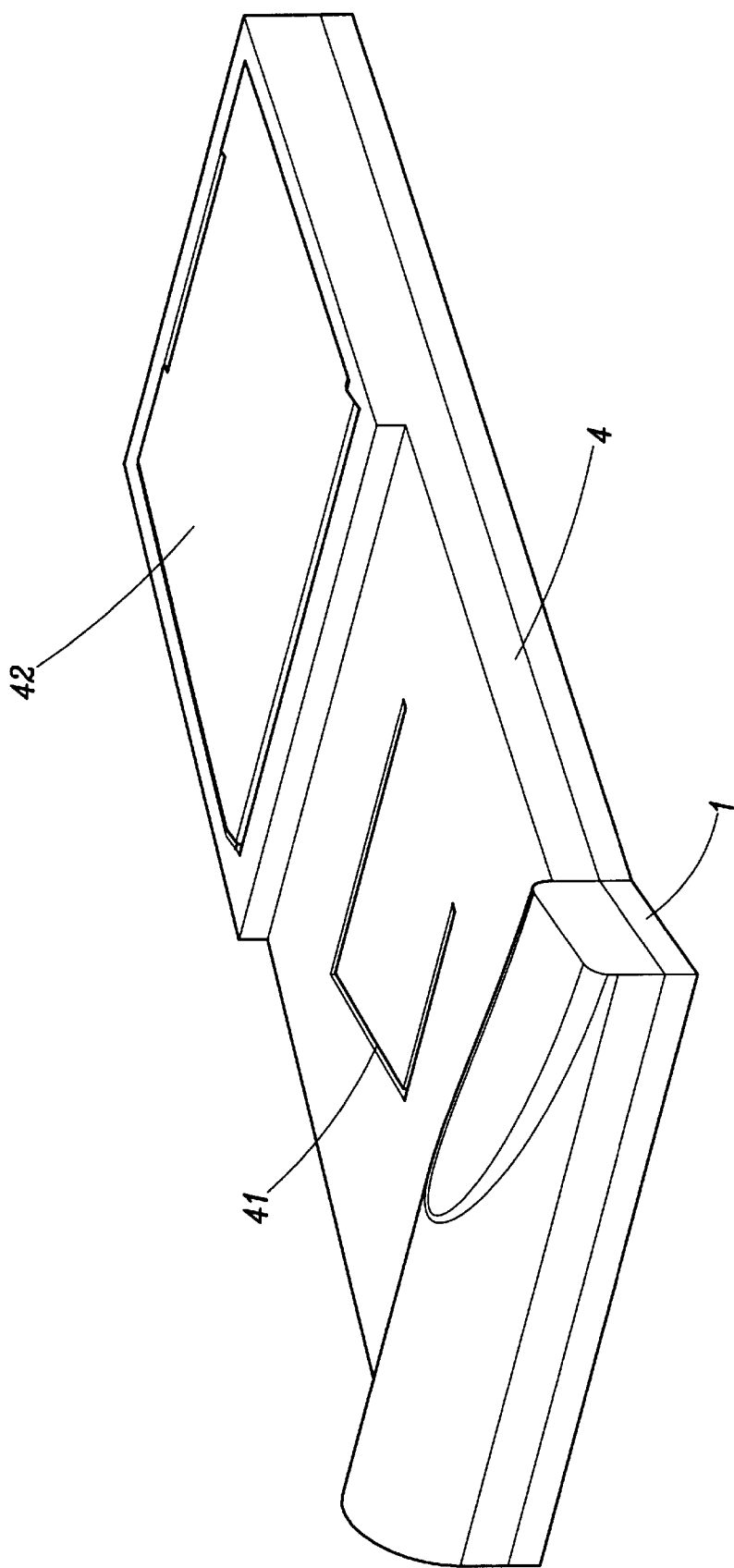
FIG. 4 illustrates the laser pointer designed for the right-handed persons according to the present invention.

Referring to FIGS. 2, 3 and 4, and FIG. 1 again, the bottom cover shell 1 is shaped like a flat, rectangular box, having a laser module chamber 11 transversely disposed at the left part thereof, the laser module chamber 11 having a first side hole 17 and a second side hole 18, a plurality of first locating ribs 15 arranged in parallel in the laser module chamber 11 at a front side, a plurality of second locating ribs 16 arranged in parallel in the laser module chamber 11 at a rear side, a circular battery seat 13 disposed at the right part thereof, an elongated recess 12 longitudinally extended from the second side hole 18 of the laser module chamber 11 to the inside of the circular battery seat 13, a plurality of first upright retainer rods 35 longitudinally arranged in line with the first side opening 17 of the laser module camber 11, a plurality of upright retainer rods 34 longitudinally arranged in the elongated recess 12 in line with the second side opening 18 of the laser module chamber 11. The battery seat 13 can be, for example, a circular chamber. Further, the left part (the laser module chamber 11) of the bottom cover shell 1 is biased, forming an angle of deviation 14. The laser module 2 comprises a laser diode and lens unit 21 mounted in the laser module chamber 1 and supported on the first locating ribs 15, and a circuit board 22 connected to the laser diode and lens unit 21 and mounted in the laser module chamber 1 and supported on the second locating ribs 16. The battery cell 5 is mounted in the battery seat 13. The metal contact plates 3 include a first metal contact plate 31, a second metal contact plate 32, and a third metal contact plate 33. The first metal contact plate 31 fits the elongated recess 12 in the bottom cover shell 1, having an angled lead end 81 inserted through the second side hole 18 and connected to the negative terminal (not shown) of the circuit board 22, an arched tail end 83 inserted into the battery seat 13 and kept in close contact with the negative terminal of the battery cell 5, and a plurality of mounting holes 36 spaced between the angled lead end 81 and the arched tail end 83 and respectively fastened to the second upright retainer rods 34 in the bottom cover shell 1. The second metal contact plate 32 comprises an angled lead end 82 inserted through the first side hole 17 and connected to the positive terminal (not shown) of the circuit board 22, an arched tail end 84 supported on the inside wall of the bottom cover shell 1, and a plurality of mounting holes 37 spaced between the angled lead end 82 and the arched tail end 84 and respectively fastened to the first upright retainer rods 35 in the bottom cover shell 1. The third metal contact plate 33 is fastened to the top cover shell 4 at the bottom side. The top cover shell 4 is covered on the bottom cover shell 1, comprising a laser firing hole 43 disposed at the front side of the left part thereof in axial alignment with the laser diode of the laser diode and lens unit 21 of the laser module 2, an opening 44 at the right part thereof corresponding to the battery cell 5 in the battery seat 13, a battery lid 42 covered on the opening 44, and a cut 41 formed on the middle between the left part and the right part and defining a spring strip 45.

Referring to FIGS. 3 and 4 again, the laser pointer can be made to fit left-handed persons or right-handed persons.

Referring to FIG. from 2 through 4 again, the aforesaid third metal contact plate 33 comprises an arched lead end 85 suspended above the arched tail end 84 of the second metal contact plate 32, an arched tail end 86 disposed in contact with the positive terminal of the battery cell 5 in the battery seat 13, and a plurality of mounting holes 38 spaced between the arched lead end 85 and the arched tail end 86 and respectively fastened to respective retainer rods (not shown) at the bottom side of the spring strip 45.

Referring to FIG. from 2 through 5 again, the laser pointer is fastened to the hand stock of the pistol 6 by an elastic band or the like 7. When the spring strip 45 is depressed with the thumb, the arched lead end 85 of the third metal contact plate 33 is forced into contact with the arched tail end 84 of the second metal contact plate 32 to close the circuit of the metal contact plates 3, the laser module 2 and the battery cell 5, thereby causing the laser module 2 to emit a laser beam out of the laser firing hole 43 at the top cover shell 4. When the thumb is released from the spring strip 41, the spring strip 41 automatically returns to its former shape, thereby causing the third metal contact plate 33 to be moved with the spring strip 41 away from the second metal contact plate 32, and therefore the circuit of the metal contact plates 3, the laser module 2 and the battery cell 5 is off:

It is to be understood that the drawings are designed for the purposes of illustration only, and are not intended for use as a definition of the limits and scope of the invention disclosed.

What the invention claimed is:

1. A laser pointer comprising:

a bottom cover shell shaped like a flat box;

a top cover shell covered on said bottom cover shell, said top cover shell having a laser firing hole;

battery means mounted inside said bottom cover shell, said battery means having a negative terminal at a bottom side thereof and a positive terminal at a top side thereof;

a laser module mounted in said bottom cover shell and controlled to emit a laser beam out of the laser firing hole at said top cover shell, said laser module comprising a laser diode and lens unit, and a circuit board connected to said laser diode and lens unit and controlled to drive said laser diode and lens unit, said circuit board having a positive terminal and a negative terminal;

a first metal contact plate fixedly mounted in said bottom cover shell, said first metal contact plate having a lead end connected to the negative terminal of said circuit board and a tail end disposed in contact with the negative terminal of said battery means;

a second metal contact plate fixedly mounted in said bottom cover shell, said second metal contact plate having a lead end connected to the positive terminal of said battery means and a tail end; and a third metal contact plate fixedly fastened to said top cover shell, said third metal contact plate having a lead end suspended above the tail end of said second metal contact plate, and a tail end disposed in contact with the positive terminal of said battery means;

wherein when the lead end of said third metal contact plate is forced downwards into contact with the tail end of said second metal contact plate, said circuit board is triggered to drive said laser diode and lens unit, causing said laser diode and lens unit to emit a laser beam out of the laser firing hole at said top cover shell.

2. The laser pointer of claim 1 wherein said bottom cover shell comprises a first part, which holds said laser model, and a second part, which holds said battery means and said first metal contact plate and said second metal contact plate, said first part biased from said second part and having a dimension smaller than said second part.

3. The laser pointer of claim 2 wherein said bottom cover shell comprises a laser module chamber at the first part thereof, which receives said laser module, said laser module chamber having a first side hole and a second side hole, said first side hole receiving said second metal contact plate, said second side hole receiving said first metal contact plate, a battery seat at the second part thereof, which receives said battery means, an elongated recess extended from the second side hole at said laser module chamber to said battery seat, a plurality of first upright retainer rods arranged in line with the first side hole at said laser module chamber, which hold said metal contact plate in place, and a plurality of second upright retainer rods arranged in said elongated recess in line with the second side hole at said laser module camber, which hold said first metal contact plate in place.

4. The laser pointer of claim 3 wherein said laser module chamber comprises a plurality of first locating ribs arranged in parallel at a front side, which support said laser diode and lens unit of said laser module, and a plurality of second locating ribs arranged in parallel at a rear side, which support said circuit board of said laser module.

5. The laser pointer of claim 3 wherein said first metal contact plate has a plurality of mounting holes spaced between the lead end and tail end thereof, and respectively fastened to said second upright retainer rods in said bottom cover shell; said second metal contact plate has a plurality of mounting holes spaced between the lead end and tail end thereof, and respectively fastened to said first upright retainer rods.

6. The laser pointer of claim 3 wherein said battery seat is a circular chamber.

7. The laser pointer of claim 1 wherein said top cover shell has a cut defining a spring strip, said spring strip having a fixed end formed integral with said top cover shell, and a free end fastened to said third metal contact plate.

\* \* \* \* \*